July 22, 1969 C. A. IRAZOQUI 3,456,817
RANDOM ACCESS STORAGE AND RETRIEVAL SYSTEM
Filed July 6, 1967 3 Sheets-Sheet 1

INVENTOR.
CARLOS A. IRAZOQUI
BY
Bacon & Thomas
ATTORNEYS

July 22, 1969 C. A. IRAZOQUI 3,456,817

RANDOM ACCESS STORAGE AND RETRIEVAL SYSTEM

Filed July 6, 1967 3 Sheets-Sheet 2

INVENTOR.
CARLOS A. IRAZOQUI

BY Bacon & Thomas
ATTORNEYS

INVENTOR.
CARLOS A. IRAZOQUI
BY
Bacon & Thomas
ATTORNEYS

United States Patent Office 3,456,817

Patented July 22, 1969

3,456,817

RANDOM ACCESS STORAGE AND RETRIEVAL SYSTEM

Carlos A. Irazoqui, New York, N.Y., assignor to Ragen Precision Industries, Inc., a corporation of New Jersey Filed July 6, 1967, Ser. No. 651,545
Int. Cl. B65g *1/06;* A47f *3/11;* A47b *49/00*
U.S. Cl. 214—16.4 6 Claims

ABSTRACT OF THE DISCLOSURE

A plurality of supports each having a row of a plurality of articles thereon, the supports being movable in respective parallel planes to move their articles serially about a closed path intersecting a common retrieval path normal to the planes, the retrieval path being defined by aligned gaps in the rows of articles so that a selected article on any one of the supports can be moved into the retrieval path, and carrier means movable along the retrieval path to carry the selected article along the retrieval path to a delivery or access position.

Background of the invention

This invention relates to apparatus for storing a plurality of discrete articles and for retrieving any desired article from storage in a random manner without the necessity of following a pre-set sequence through the positions of various other articles.

In the assembly of mechanical or electronic devices it has heretofore been the practice to provide personnel with a plurality of bins of articles and adequate instructions to enable the person to select a part from a proper bin for assembly in predetermined sequence. However, this arrangement is time-consuming and subject to errors in selection. Furthermore, such a conventional system involves an inefficient use of space and thus increases the cost of the product. Also, in the storage and retrieval of information, such as information recorded on microfilm, it has heretofore been necessary to select a particular reel of film, then thread the same in a projector or reading machine and transport all of the unwanted film past the projector until the desired portion was reached.

Summary of the invention

The present invention comprises an apparatus for storing discrete articles of any kind, whether they be individual articles, containers of a plurality of duplicate elements, or information records, such as microfilm chips or the like. The apparatus comprises a plurality of supports, each adapted to carry a multiplicity of the articles arranged in a line thereon and to move the articles of the line sequentially around a closed path in a plane parallel to the plane of movement of adjacent supports. The supports are moved until a selected individual article thereon is positioned in a retrieval path intersecting all of the individual closed paths of the various supports. The retrieval path is defined by notches or openings in the separate supports and resulting in a gap in each line of articles, which gaps are normally positioned in alignment to define the retrieval path. When a support has been moved to position a selected article in the retrieval path a carrier member is caused to move along that path, pick up the article therein and transport it to a position of access at one end of the path. Various structural details and modifications thereof are described herein by way of example only.

Description of the preferred embodiments

Figure 1:
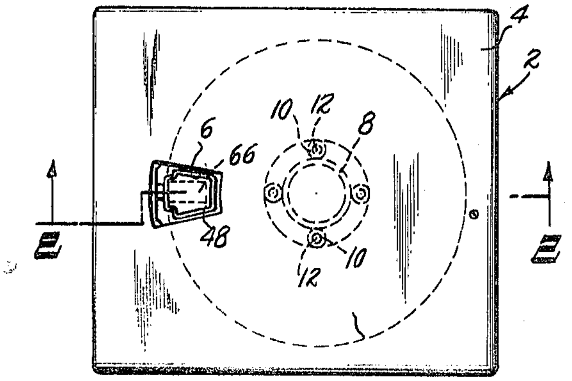
FIG. 1 is a top plan view of a cabinet embodying a storage and retrieval apparatus of the present invention.

Referring first to FIG. 1, numeral 2 indicates generally a cabinet structure having a top 4 having an upper surface defining a worktable or the like. An access opening 6 is provided in the top 4 and through which selected articles are delivered to be accessible to the operator of the apparatus.

Figure 3:
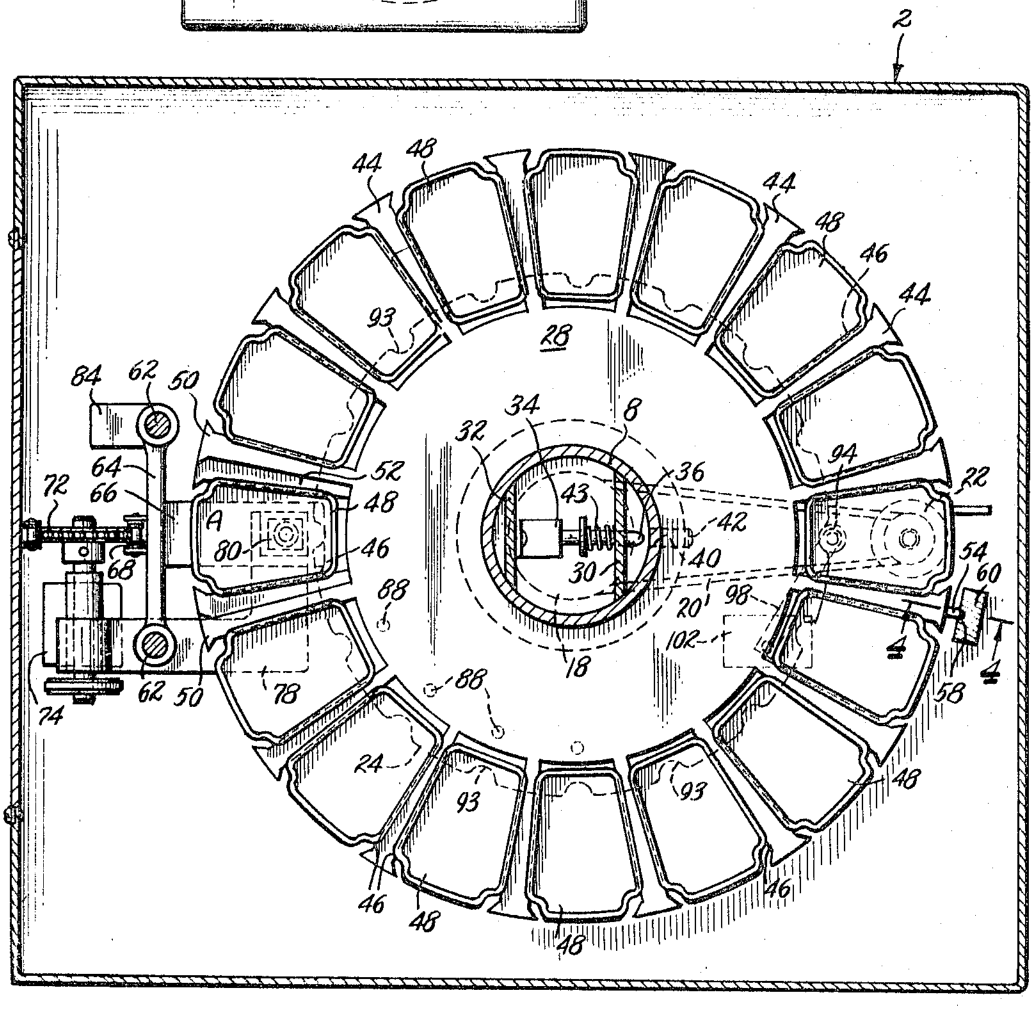
FIG. 3 is a horizontal sectional view taken along the line 3—3 of FIG. 2.
Figure 2:
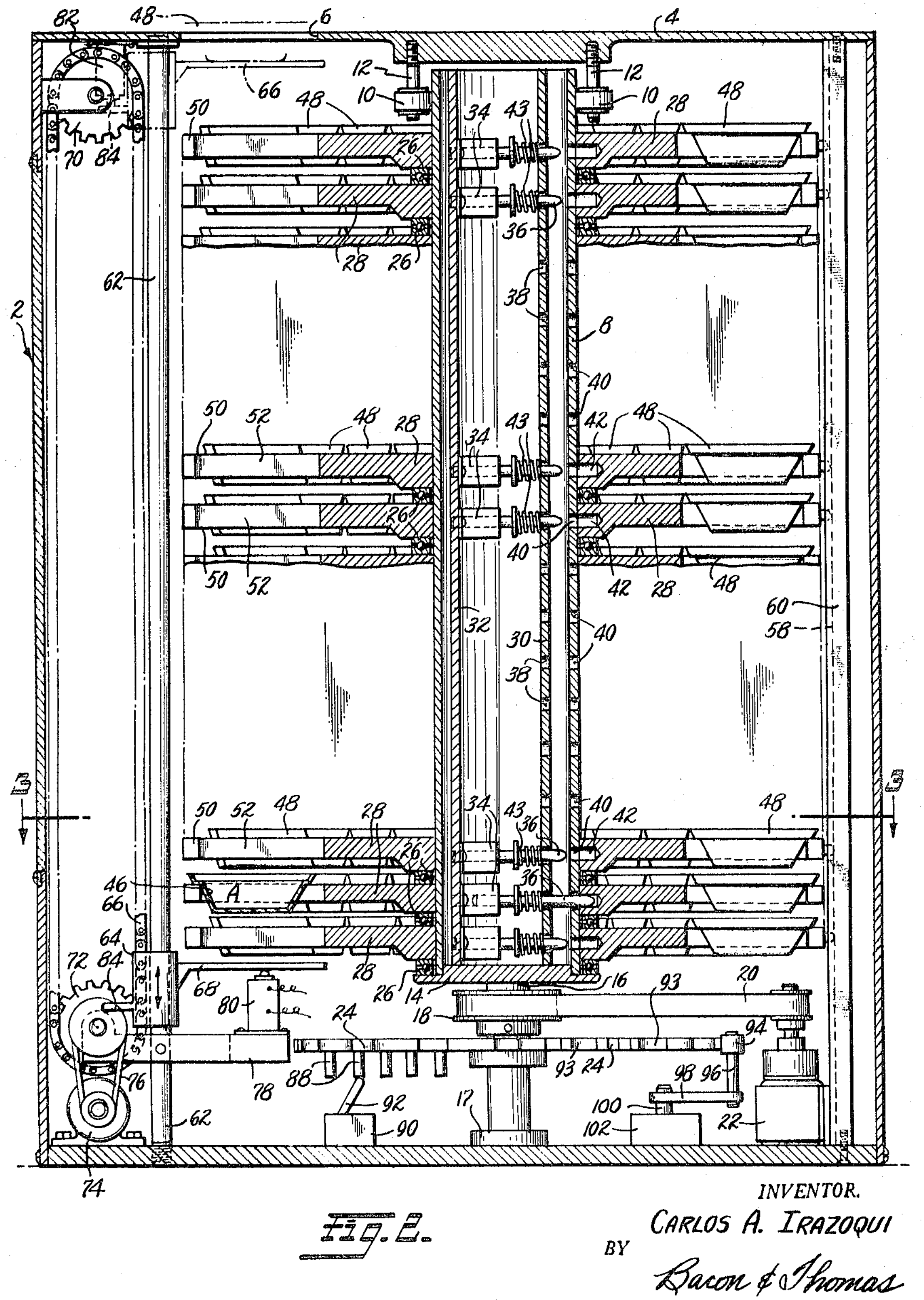
FIG. 2 is an enlarged vertical sectional view taken along the line 2—2 of FIG. 1.
Figures 4, 5, 6, 7:
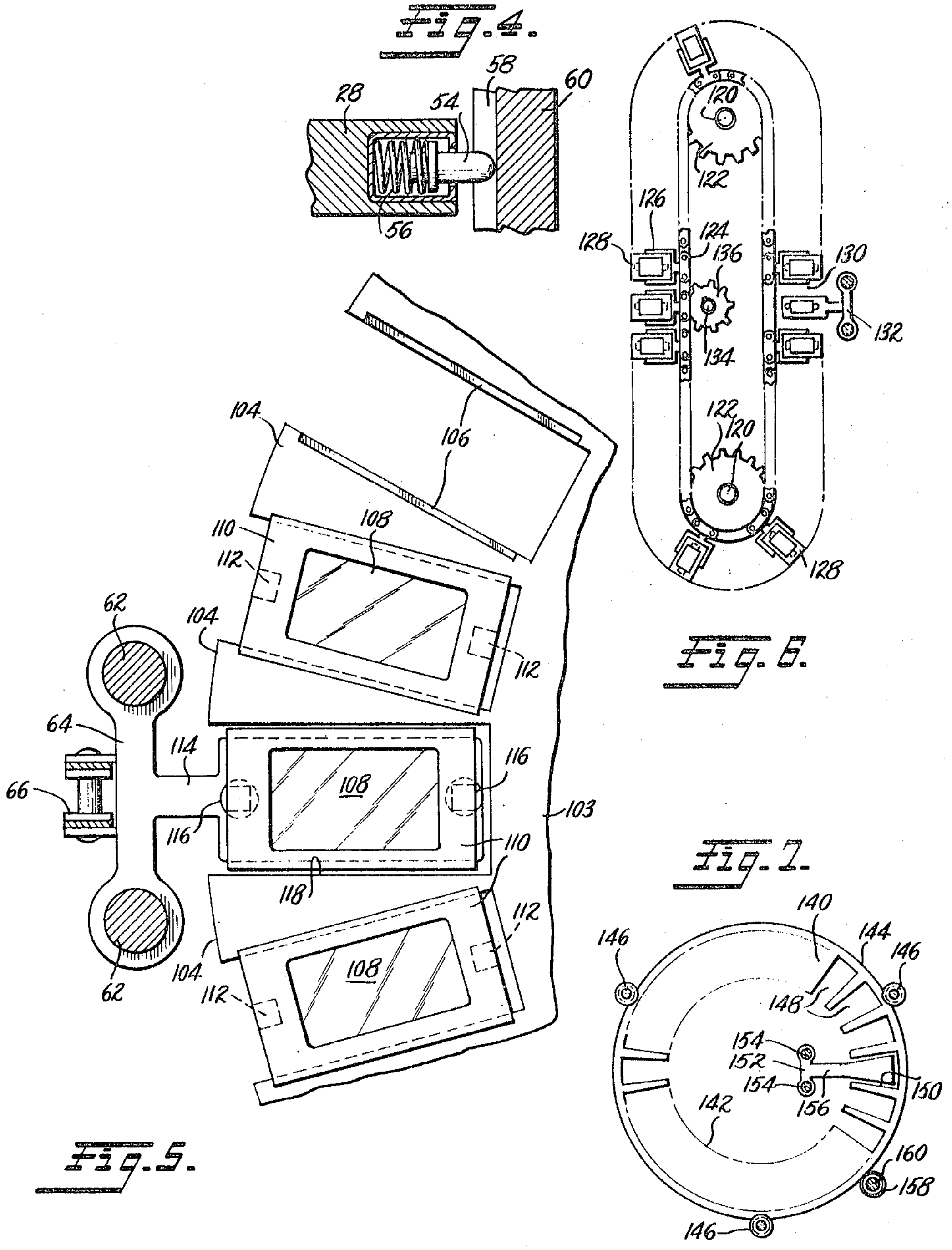
FIG. 4 is an enlarged fragmentary sectional view taken on the line 4—4 of FIG. 3.
FIG. 5 is a fragmentary sectional view, similar to a portion of FIG. 3, but showing a modified form of support.
FIG. 6 is a schematic view illustrating another modification of the invention.
FIG. 7 is a schematic view illustrating a further modification.

Referring now to FIGS. 2 to 4, the cabinet 2 defines a storage compartment in which a hollow tubular shaft 8 is mounted. The shaft 8 is journalled at its upper end by guiding and supporting rollers 10 journalled on stub shafts 12 fixed to the top 4 of the cabinet. At its lower end the tubular shaft 8 is closed by a cap member 14 fixed to a shaft 16 on which a drive pulley 18 is secured. The shaft 16 is suitably journalled in a bearing 17 in the bottom of cabinet 2. A belt 20, driven by a reversible motor 22 can effect rotation of the pulley 18 and shaft 16 in either direction. Also fixed on the shaft 16 is an indexing disc 24 which will be described in greater detail later. Supported on the cap member 14 is a thrust bearing 26 rotatably supporting a lower disc 28 loosely rotatable about the hollow shaft 8. Thus, the disc 28 is free to rotate relative to the shaft 8. Additional thrust bearings 26 are positioned about the shaft 8 and each supports a further similar disc 28 above the lowermost disc so that the cabinet contains a multiplicity of stacked discs 28, each being independently rotatable about the tubular shaft 8. Within the tubular shaft 8 crossplates 30 and 32 are fixed. The plate 32 carries a plurality of solenoids 34, one for each disc 28, and each solenoid is provided with an armature member in the form of a clutch pin 36 extending through a guide opening 38 in plate 30 and aligned with a radial opening 40 in the wall of shaft 8. Each opening 40 is axially aligned with a socket 42 in the hub of a corresponding disc 28. Springs 43 hold the clutch pins 36 normally retracted but when a particular solenoid 34 is energized, its armature pin 36 is projected outwardly, as shown near the bottom of FIG. 2, to extend through an opening 40 into a socket 42 in a selected support disc 28 to thereby clutch that disc to the shaft 8 for rotation therewith. Thus, when the motor 22 is energized to rotate shaft 16, a single selected disc 28 can be rotated therewith.

Referring now to FIG. 3, each of the support discs 28 is provided with a plurality of radially extending fingers 44 defining between them seats 46 adapted to receive and support containers or bins 48 for holding small articles. The bins or containers 48 may be of the general nature shown in FIG. 2, provided with an outwardly extending rim portion adapted to support the same between the arms 44 on the upwardly facing seats 46. Two of the arms, identical to the arms 44 but identified in FIG. 3 as arms 50 (shown at the left side of the figure), are spaced circumferentially apart a distance greater than the radial fingers or arms 44 to thus define a notch or opening therebetween 52 of greater width than the containers or bins 48. Obviously, no bin 48 is supported by the widely spaced fingers. It can be said that the bins or articles 48 are arranged in a line (circular) on their support 28 with the wide notch 52 defining a gap in that line. Each of the support discs 28 is provided with a spring-detent 54 (see also FIG. 4) normally projected radially outwardly by a spring 56 to releasably engage within a groove 58 in a fixed holding member or bar 60, fixedly mounted within the cabinet 2 adjacent the peripheries of the discs 28. The spring detents 54 are so positioned that when they engage in the groove 58 the corresponding notch or gap 52 is in the position shown in FIG. 3 and with the corresponding notches or gaps of all support discs 28 in vertical alignment. Thus, the notches 52 define a retrieval path extending vertically in the cabinet 2 and which terminates at its upper end in the opening 6 previously referred to.

Within the cabinet 2 a pair of guide rods or rails 62 are mounted to extend from the top to the bottom thereof outwardly out but adjacent the peripheries of the discs 28. These guide rods are positioned opposite the position normally assumed by the wide notches 52. A carriage 64 is slidably guided by the rods 62 and is provided with an inwardly projecting platform or plate 68, extending inwardly within the retrieval path defined by the aligned wide notches 52. An endless chain 66 is secured to the carriage 64 and is trained over upper and lower sprockets 70 and 72, the upper one being an idler. A reversible motor 74 is arranged to drive the lower sprocket 72, through a belt 72, in either direction of rotation. The drive sprocket 72 is shown as being journalled on a fixed bracket 78 which also carries a lower limit switch 80 positioned below the platform 68 and in position to be engaged thereby when the platform 68 is substantially below the lowermost support or disc 28. At its upper portion, the cabinet 2 is provided with a limit switch 82 positioned in the path of travel of a finger or extension 84 on carriage 64.

The shaft 16, which carries the tubular shaft 8 also has fixed thereto the indexing disc 24, previously referred to. The disc 24 is shown as provided with depending index pins 88, there being a pin for each of the seats 46 and one for the wide notch 52. Fixed to the base of the cabinet is a wiper or detecting device 90 having a member 92 responsive to engagement with a pin 88 for a purpose to be described.

The outer periphery of the indexing disc 24 is provided with indexing notches 92 therein, there being a notch 93 corresponding to each of the seats 46. An indexing assembly comprises a roller 94 on a stub shaft 96 which is carried by a crank arm 98 fixed to a shaft 100 operable by suitable mechanism in casing 102. The mechanism in casing 102 may be a solenoid adapted to oscillate the shaft 100 and thereby project the roller 94 toward or from a notch 93 in disc 24.

Control circuits for the apparatus are not shown herein since many different circuits may be employed, suitable circuits being obvious to those skilled in the art. The invention resides in the structural arrangement so far described and not in any particular control circuitry or specific sequence of operation of the parts. However, it is contemplated that the device may be programmed and under the control of computers or the like, on the other hand it may be sequentially cycled by magnetic tape, punch cards, or any other suitable control apparatus where desirable. Also, it may be manually set and operated for each cycle if desired. The manner of use and a preferred sequence of operations will now be briefly described.

At the start of any cycle of operation, the carriage 64 and platform 68 will be in their lower position, as shown in FIG. 2, with the motor 74 deenergized. All of the discs 28 will be in position where their notches or gaps 52 are in vertical alignment and all of the spring detents 54 will be engaged in the groove 58. All of the solenoids 34 will be deenergized so that no disc 58 is clutched to the tubular shaft 8. The motor 22 will be deenergized and stopped and the roller 94 will be in seated position in a notch 92 in the periphery of disc 86. Let us now assume that the operator desires to have access to the contents of one of the trays 48 in the cabinet. By manipulation of suitable pushbuttons or the like or in response to a pre-set program, detecting device 90 is conditioned in a suitable circuit, not shown, to detect a conditioned pin 88 on disc 24 one of the pins 88 on disc 24 will be conditioned in a control circuit (not shown) and at the same time motor 22 will be started. The operation of the pushbuttons or program control will effect energization of the appropriate solenoid 34 to project its clutch pin outwardly and thereby clutch the proper support disc 28 to the shaft 8. It is contemplated that suitable logic circuitry be provided so that rotation of the motor 22 will be in a direction to move the selected tray 48 to the proper position with the least amount of rotary movement. Such logic circuits are well known and need not be described. However, the motor 22 will thus rotate the shaft 8 and the selected disc 28 until the selected article tray 48 is positioned in the retrieval path, previously described and which tray is indicated at A in FIGS. 2 and 3. When the tray reaches such position, the conditioned pin 88 will be engaged by the detector 92 and this will deenergize motor 22 to stop the same and at the same time will rotate the shaft 100 to project indexing roller 94 into an adjacent notch 93 to thus hold the selected disc 28 with its selected tray 48 in the retrieval path previously described. It is to be noted that none of the other discs 28 will rotate during the function just described since their spring detents 54 hold them against rotation. However, when a selected disc is clutched to the shaft 8, the torque applied by motor 22 is sufficient to forcibly disengage corresponding detent 54 from groove 58.

After the selected disc 28 has been stopped in the proper position, as already described, the signal provided by detector element 92 effects energization of motor 74 in a direction to drive the carriage 64 upwardly. As the carriage moves upwardly, its platform 68 will engage the bottom of the tray A and continued upward movement will lift that tray from its seat 46 and carry it upwardly along the retrieval path to the position shown in dotted lines at the top of FIG. 2 where the tray and its contents are accessible through opening 6. For example, a worker working on the surface of top 4 may select one or more items from the exposed tray for assembly in an electronic circuit or the like. When the platform 68 reaches the upper position described, the finger 84 engages limit switch 82 to stop the motor 74 and condition the circuits leading thereto so that the next time it is energized it will rotate in the opposite direction. After the workman has finished with the exposed tray 48 and/or its contents, he may press a cycling button or in any other way start the next portion of a complete cycle of operation, which first merely energizes motor 74 to draw the carriage 64 downwardly. The tray on platform 68 moves downwardly therewith until it reaches the seat from which it was removed whereupon it will rest on that seat while the carriage 64 continues to move downwardly to engage limit switch 80 and again deenergize motor 74 and condition it for reverse operation. Preferably thereafter, the motor 22 will operate to return the previously rotated disc 28 to its "home" position wherein its detent 54 again engages groove 58 and its corresponding solenoid 34 is then deenergized, thus preparing the apparatus for a subsequent article retrieval cycle. Obviously, return of the discs to their home position will be made with the indexing roller 94 retracted outwardly to permit the shaft 8 to rotate freely and additionally, the conditioning of sensor 90 is deactivated for the purposes set forth above.

As stated previously, the interaction between the circuits suggested herein is not a part of the present invention since many such circuits and relationships therebetween may be employed, all of which will be obvious to those skilled in the art.

FIG. 5 is a fragmentary illustration of a modified form of apparatus wherein the support discs 103 are not designed to support trays 48 but are constructed with radially extending fingers 104, the edges of which are provided with recesses 106 defining upwardly facing seats. Otherwise, however, the discs 103 may be mounted and driven in the same manner as discs 28 of FIGS. 2 and 3. Each of the seats supports an article comprising a microfilm chip 108, or the like, mounted in a suitable frame 110, which may be of cardboard or any other suitable material. As shown, each of the frames 110 is provided with paramagnetic metal clips 112 secured to the under surfaces thereof. In this form of the invention the carriage 64 guided by rods 62 and driven by chain 66 is also provided with an inwardly extending projection or platform 114 having thereon permanent magnets 116 arranged to engage the metal clips 112, when the platform moves upwardly and thus securely hold the mounted microfilm 108 during transportation upwardly along the retrieval path to a position of access at the top of the cabinet. In this form also one of the notches between fingers 104, namely, the notch identified in FIG. 5 as 118, is wider than the notches having the recesses 106 so that the mounted film chips can readily pass through that wider notch along the retrieval path. After appropriate use of the selected chip and upon lowering of the platform 64 with the chip 108 thereon, it will pass freely downwardly through the aligned notches 118 until it reaches the disc 103 from which it was removed. When it reaches that disc the edges of the frame 110 will engage in the recesses 106 and the mounted chip will then be retained on that disc as the platform 114 continues to move downwardly, as previously described.

In the form of device shown in FIG. 5, the discs 103 may be much thinner than those shown in FIG. 2, since they do not have to retain trays of substantial depth, and a great many more discs may be provided in a cabinet of the same height thus providing for the storage and retrieval of a great number of mounted film chips or similar articles.

FIG. 6 schematically illustrates a further modification. In this form a pair of horizontal shafts 120 is provided and on each of which a multiplicity of idler sprockets 122 are journalled in side-by-side relation. An endless chain conveyor 124 is trained over each pair of sprockets 122 and each chain is provided with article holders 126, shown in this embodiment as being of generally U-shape to embrace and hold the edges of film chips 128 similar to those described with reference to FIG. 5. Preferably, the holders 126 will be magnetized or so constructed as to hold the film chips in the manner shown. As shown on the right side of FIG. 6, a gap 130 is provided in the line of holders 126 to define a retrieval path along which a carriage 132 can be driven in a manner similar to that already described.

A drive shaft 134 is provided with sprockets 136 slidably keyed thereon and capable of selectively meshing with any one of the chains 124. Suitable means are contemplated but not shown whereby sliding sprocket 136 may be positioned to drive a selected chain 124 a desired amount to position a selected chip 128 in the retrieval path defined by the aligned gaps 130. This modification merely illustrates a further concept wherein the supports (chains 124) need not be rigid discs but may be in the form of flexible conveyor devices.

The modification shown in FIG. 7 is similar to that of FIGS. 1 to 5 in that it employs rotary discs. However, each of the discs 140 is actually ring-shaped or annular, having a central opening 142 therein. The outer peripheral portion 144 of each is continuous and circular and engages a plurality of grooved supporting rollers 146 which support the discs for individual rotation. Each of the discs is provided with recesses or notches 148 opening inwardly toward the inner periphery of the annulus and constituting seats for the articles. One of the grooves or notches 150 is wider than the others and through which the containers or articles can pass freely.

A carriage 152 is slidably guided by rods 154 and may be driven in any suitable manner, such as that described with reference to FIG. 2. The carriage 152 is provided with an arm 156 extending outwardly therefrom and adapted to move along the retrieval path defined by the wide notches 150 whereupon it can engage and lift or otherwise carry an article on one of the seats 48 along the retrieval path in the manner already described.

To effect rotation of a selected annular disc, driving means shown herein as a friction roller 158 is provided. The roller 158 is carried by a shaft 160 and may be positioned in contact with the periphery of any selected disc 140 whereupon rotation of the roller will then drive that disc in rotation. Obviously, individual drive rollers could be provided for each disc and may be selectively coupled to a suitable drive means and also the periphery of the disc 140 could be provided with teeth meshed with teeth on a driving gear or sprocket.

The principles of the invention exhibited by apparatus described are obviously adaptable to the storage and random retrieval of any type of discrete articles, of any size and/or shape.

What is claimed is:

1. An article storage and retrieval apparatus comprising: a plurality of discs mounted for rotation about a common axis, and having seats defined by open peripheral notches, said discs being independently and selectively rotatable about said axis; a container for articles seated in each notch, a gap between two of said notches, said gap being defined by a further peripheral notch wider in a peripheral direction than the corresponding dimension of any of said containers; latch means for releasably holding all said discs with their respective gaps in alignment to define a retrieval path; means for rotating a selected one of said discs to position a selected container thereon in said retrieval path; and carrier means movable along said retrieval path, from one end to the other thereof, to engage said selected container, lift the same from its notch, and carry the same to said other end of said retrieval path.

2. Apparatus as defined in claim 1 wherein said latch means comprise a spring actuated detent on each disc and a stationary detent-engaging means adjacent the periphery of each disc.

3. Apparatus as defined in claim 1 including a hollow shaft defining said common axis, said discs being separately journalled about said shaft, means for rotating said shaft; and selectively operable means within said hollow shaft for clutching said selected support to said shaft for rotation therewith.

4. Apparatus as defined in claim 1 wherein said carrier means comprise guide means parallel to said retrieval path outwardly of said discs and a carriage movable along said guide means and having an inwardly extending holder adapted to engage the bottom of said selected container and lift the same from its seat.

5. Apparatus as defined in claim 1 wherein said carrier means is movable in both directions along said retrieval path for returning said selected article to its holding means, from said end of said other retrieval path.

6. Apparatus as defined in claim 1 including a cabinet having an upper surface; said discs being in said cabinet in vertically stacked relation and with said retrieval path extending vertically therein; and an opening through said other upper surface, in alignment with said retrieval path at said end thereof whereby said selected container is made accessible through said opening.

References Cited

UNITED STATES PATENTS

| | | | |
|---|---|---|---|
| 1,925,442 | 9/1933 | Fournier | 214—16.1 |
| 3,135,422 | 6/1964 | Woodruff | 221—122 |
| 3,204,785 | 9/1965 | Bajulaz | 214—16.1 |
| 3,312,370 | 4/1967 | Kolarich et al. | 221—79 |

FOREIGN PATENTS

| | | |
|---|---|---|
| 786,874 | 9/1935 | France. |
| 1,070,286 | 2/1954 | France. |

GERALD M. FORLENZA, Primary Examiner

RAYMOND B. JOHNSON, Assistant Examiner

U.S. Cl. X.R.

221—79, 122; 312—223